United States Patent [19]

Schutzler

[11] 4,294,559
[45] Oct. 13, 1981

[54] PRE-STRESSED STRUCTURAL JOINT

[75] Inventor: Jerome C. Schutzler, El Toro, Calif.

[73] Assignee: PDA Engineering, Santa Ana, Calif.

[21] Appl. No.: 70,167

[22] Filed: Aug. 27, 1979

[51] Int. Cl.³ .......................... F16B 4/00; F16D 1/00; F16L 25/00

[52] U.S. Cl. ..................................... 403/28; 285/381; 285/89; 411/132; 411/260; 411/531

[58] Field of Search ............... 403/28, 29, 30; 285/89, 285/92, 381, 355, 390, 422; 85/50 R, 37; 151/38

[56] References Cited

U.S. PATENT DOCUMENTS

| | | | |
|---|---|---|---|
| 3,150,889 | 9/1964 | Watts | 285/381 X |
| 3,608,933 | 9/1971 | Lee | 285/89 X |
| 3,764,169 | 10/1973 | St. Clair | 285/381 X |
| 3,805,567 | 4/1974 | Agius-Sinerco | 285/381 X |
| 4,035,007 | 7/1977 | Harrison et al. | 285/381 |
| 4,198,081 | 4/1980 | Harrison et al. | 285/381 |

FOREIGN PATENT DOCUMENTS 4696 1/1979 European Pat. Off. ............ 285/381

Primary Examiner—James Kee Chi
Attorney, Agent, or Firm—George F. Bethel; Patience K. Bethel

[57] ABSTRACT

The following specification discloses the use of a nickel titanium alloy component referred to as Nitinol for purposes of providing a pre-stressed structure. The alloy component provides stiffness to shell structures and tubular members such as oil well pipes, and conduits, as well as pre-stressed loadings for head bolts on engines or other pre-stressed fasteners. Pre-stressing is accomplished by deforming the Nitinol component below its transformation temperature which can be a cryogenic temperature, after which the Nitinol component returns by its memory to a desired shape for pre-stressing. The foregoing develops a large pre-load on a structural joint, so that successful design applications of Nitinol can pre-load joints with minimum load path offset for a shell or other structure. This minimizes in-plane local moments, as well as eccentric loading, and provides joints of lower weight and less internal volume protrusion.

6 Claims, 5 Drawing Figures

PRE-STRESSED STRUCTURAL JOINT

BACKGROUND OF THE INVENTION

1. Field of the Invention

The field of this invention lies within the structural field as it relates to joints, couplings, bolts, and various fastening means. More particularly, it involves the field of providing greater strength within a joint by means of pre-loading and pre-stressing through a supplemental structural member extrinsic to the basic member itself.

1. The Prior Art

The prior art related to joints, fasteners, bolts, and other structural components for such things as pipes, oil well casings, and similar shell structures, has generally involved many types of joint and fastener configurations. Some of these have incorporated bolt and nut configurations with lock washers and other fasteners.

In addition to the foregoing fastening means, shell structures have incorporated various tensioning and clamping devices, as well as tension wrap means and other structures for securing a joint. Oftentimes, such shell structures are threaded together with heavy duty threads, so that the elements to be joined can be torqued down on each other to provide a substantial degree of tightness and fit.

In most designs, the weakest point of a member that uses the inherent structure of the member for coupling purposes is within the joint. In other words, when a tubular member is threaded together or joined, a substantial problem resides within the threaded joint. This is due to the fact that certain frequency and vibratory modes of the structure or tubular member limit the design functions.

A design requirement is to increase the joint stiffness to the same degree of the entire structure. In other words, the tubular member as it exists without a joint has a certain given stiffness. If the joints can also be maximized to the same degree of stiffness to retain a stiff joint, a substantial reduction of overall shell thickness or structural weight can be reduced. It has been found that the structure of such items can be reduced as to overall shell weight by increasing the joint stiffness by a significant factor. Other configurations, such as pipes for oil wells, casings, shell structures and pipelines that span chasms are subject to a bending moment, as well as other joints and configurations which have stiffness requirements.

One of the principal requirements for a high-stiffness joint is the application of a large pre-load. This can be developed in flange joints with threaded fasteners. However, for certain applications, this type of joint generally has unacceptable volume protrusion and accessability.

Threaded and breach lock joints are difficult to pre-load because of friction within the threads. Furthermore, they are susceptible to unloading during vibratory or shock conditions. In other words, even though a threaded joint within a tube, pipe, or other shell can be loaded substantially, it must be remembered that the threads have a certain coefficient of friction between the lands and the grooves and as the friction builds up during the tightening process, it eventually limits the pre-load that can be established by the friction of the threads.

In addition to the foregoing problems, a problem has evolved with regard to the engine head bolts or other bolted elements. This is particularly true with respect to maintaining head bolts on diesel engines which have a tremendous amount of vibration. The head bolts, as can be understood, in any internal combustion engine, must be torqued to a certain point to maintain both compression and a seal. In many cases, the head bolts on such internal combustion engines are placed in a vibratory mode and eventually loosened to the point where the original torque is no longer present. This, of course, creates problems with regard to a lack of a seal, as well as the bolt jarring loose at a later point in time.

By utilizing the shape recovery characteristics of Nitinol, which is fundamentally a nickel titanium alloy, which can also be alloyed with cobalt for providing lower temperatures of transformation, a pre-loaded structural joint can be designed in various configurations. The basic design criteria for the pre-loaded structural joint is such that its strength or stiffness should be equal to or greater than that of the surrounding shell or other structure over its full load range. This also applies to the fundamental usage of the structure herein with regard to head bolts or other structural tightening means. It should also provide resistance to vibratory unlocking.

Many of these basic design criteria are incorporated to provide the foregoing enhanced features for overcoming the deficiencies of the prior art, as previously stated. In addition thereto, the Nitinol pre-loaded joints of this invention are a substantial step over the prior art as to the evolvement and development of pre-loaded structures and in particular, structures that retain a desired value of stiffness.

SUMMARY OF THE INVENTION

In summation, this invention comprises the shape recovery characteristics of Nitinol for pre-loading structural joints.

More particularly, the invention incorporates the idea of utilizing Nitinol as a washer, a joint, or a clasping means for holding a particular connection together. The Nitinol is cooled to the point where it can be deformed to a particular conformation. The deformation of the conformation into which it is placed is then allowed to re-form through its shape recovery characteristics to the point of its original conformation at ambient temperature.

The memory of the Nitinol at ambient temperature, or whatever elevated temperature is to be utilized effectively provides a work effort against a structural member, a fastener such as a bolt or rivet, or a threaded connection. This in turn causes a pre-load or an expansion so that the joint is pre-loaded and pre-stressed for providing either stiffness to a tubular member for pre-stressed strength, or locking and loading of a fastener for a tightened connecting relationship.

The foregoing features allow for the provision of increased stiffness of joints, stronger joints with a minimum weight and a minimum amount of volume protrusion, as well as resistance to vibratory unlocking.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

This specification sets forth the preferred embodiments hereof by way of the initial description herein being of the apparatus which shall be followed by the process for accomplishing the invention.

A description of the material used herein can be characterized as a nickel titanium alloy. The nickel is usually fifty five percent nickel and forty five percent titanium wherein the former percent nickel is by weight. At this particular alloy concentration of nickel and titanium (hereinafter referred to as Nitinol) the temperature can be lowered to below approximately 15° F. and deformed after which it will return to its original memory shape at ambient temperatures.

Lower transition temperatures than 15° F. are usually utilized in order to work with Nitinol so that it will not deform at ambient temperatures which can be close to 15° F. In order to lower the transformation temperature range of the composition, cobalt is utilized as a substitution for the nickel. The cobalt can be used up to a maximum of 5%. It has been found that concentrations of cobalt up to 5% can create a minimum deformation temperature as low as minus 320° F. At this temperature, the Nitinol can be deformed in whatever manner is desired and when brought to ambient temperature, it will return to its original configuration. Generally, the contraction expansion for this invention can be in the neighborhood of 8%.

The shape memory characteristics of Nitinol shall be discussed hereinafter. Suffice it to say, it is implaced within the structure as hereinafter described in a cooled state, such as that provided by liquid nitrogen and then allowed to be brought back to ambient temperature after it is implaced in the structure for expansion purposes.

Figure 1:
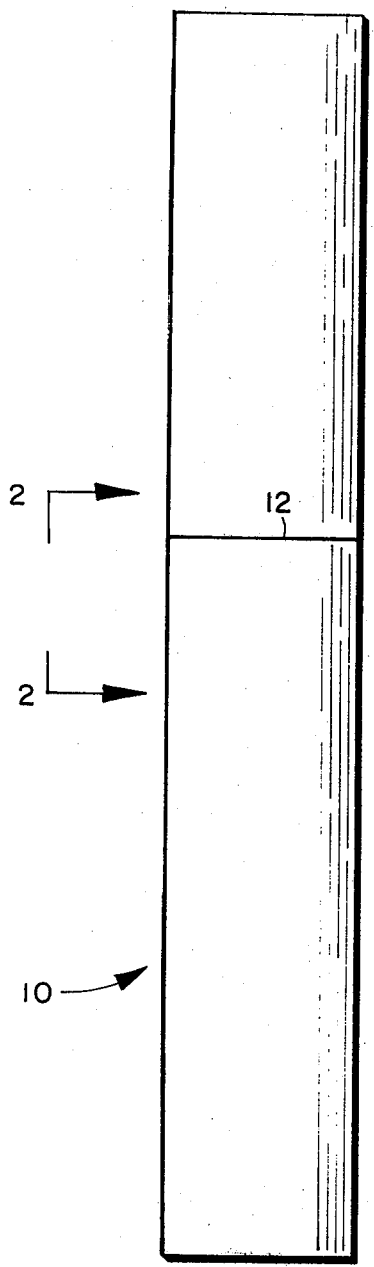
FIG. 1 shows an example of a shell or tubular casing that can utilize the joint of this invention.

FIG. 1 shows an example of a structure which is a tubular shell structure. The tubular structure is joined by a threaded connection, such as that shown in FIG. 2. The threaded connection, by way of example, uses buttress threads as described hereinafter with a Nitinol pre-load segment in order to stiffen the shell.

Specifically, the FIG. 1 structure 10 has a joint 12. The shell wall has been exemplified by a tubular well portion shown in FIG. 2 as sectioned in the direction of lines 2—2 of FIG. 1.

Figure 2:
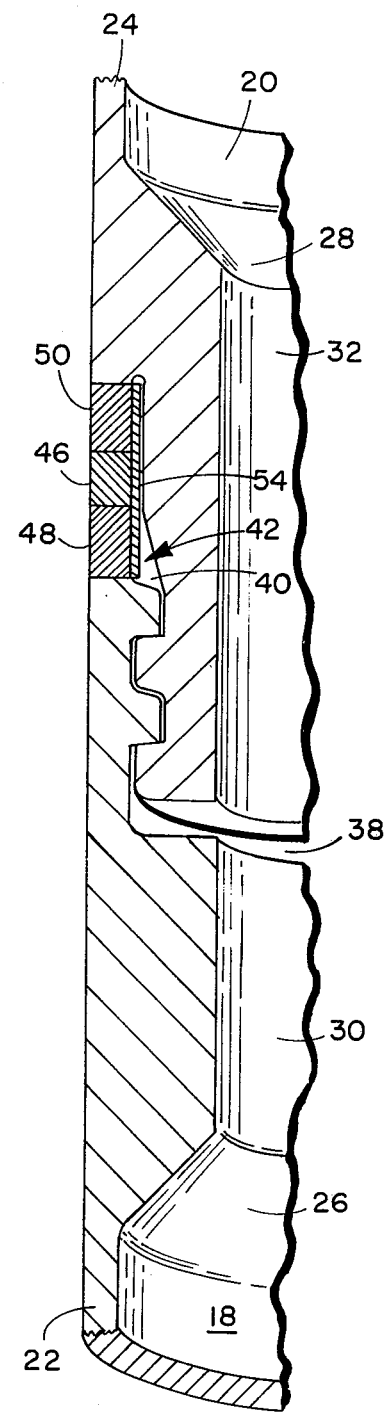
FIG. 2 shows a cross sectional configuration of a portion of the shell as joined together in the direction of lines 2—2 of FIG. 1.

FIG. 2 shows the detailed tubular structure of the shell 10. The tubular structure has been shown in two segments, namely segment 18 and segment 20. The tubular segments 18 and 20 have a limited cross sectional area, respectively 22 and 24. These widen into a tapered surface, respectively surfaces 26 and 28 and into thicker portions 30 and 32 for providing the joint of the shell structure. It should be understood that the shell structure in this particular instance is only exemplary. The tubular configuration or cylindrical shell as sectioned in FIG. 2 can be part of an oil well casing, oil well drilling string, pipeline or other cylindrical structural member that is subject to bending moments.

The enlarged or thickened portions 30 and 32 have a pair of buttress threads that comprise lands and grooves in a buttress thread configuration. The lands and grooves have been shown as only being two and three in number due to the limited way in which such lands and grooves are generally connected in buttress threads. However, it should be understood that a plurality of various types of threads can be utilized having a substantial number of lands and grooves.

When the members 30 and 32 are threaded together, they provide a space 38 between the respective members and a second space 40 which is a sloping space below a generally cylindrical channel that is between the two members 30 and 32. The cylindrical channel which is fundamentally a channel 42 surrounds the member 32, allowing for not only the threading to be accomplished of the two members 30 and 32, but also the insertion of the Nitinol segment that accompanies the support structure.

The showing comprises a Nitinol pre-loaded segment 46 that can be in completely cylindrical form, segmented or partitioned in a number of various segments and inserted for pre-loading in a number of arcuate segments. Surrounding either side of the Nitinol pre-load segment are two steel insulator circumferential rings 48 and 50 that circumscribe the member 32. The insulator rings 48 and 50, along with the Nitinol pre-loading segment 46 rest upon a plastic insulator sleeve circumferentially surrounding the member 32, namely sleeve 54. Sleeve 54 in this particular instance has been made of Teflon and provides thermal insulation to the members, as well as the capability of the members in their pre-loaded and loaded configuration to expand freely on the surfaces thereof for pre-stressing and pre-loading the entire structure of FIG. 2.

The threaded section of the joint shown in FIG. 2 produces an offset load path which creates a meridionally distributed bending moment. The transition region of the joint serves to eliminate most of this moment, thereby stiffening the joint and reducing the moment propagated down the walls 22 and 24. Moments propagated down the walls reduce the permissible shell loading as previously stated, on the cylindrical portion before the point of incipient bending.

The threaded section of the lands and grooves serve as a point of attachment for the joints. The buttress threads are chosen because the vertical face of the threads eliminate the radial force components resulting from the cosine of the thread angle and the applied load. The large thread cross section produces a large section modulus in the section area which reduces strains and which can be heavily loaded by the Nitinol section of this invention.

The insulation system with the metal insulator rings 48 and 50 and the Teflon sleeve 54 is used to prevent the onset of Nitinol recovery before the joint is fully assembled. By using the Teflon sleeve, thermal insulation prevents a heat sink, avoiding rapid recovery of the Nitinol. It should be understood that if the Nitinol recovers from its deformation too quickly, there may not be sufficient time for manual assembly of the joint.

The recovery of the segment 46 is of course dependent upon thickness and general overall heat transfer characteristics which can be modified as a matter of test and analysis.

The thickness of the Nitinol segment must also be sized to offer enough recovery strain when it returns to its memory, while at the same time pre-loading the joint. However, the recovery strain should not be enough to cause significant plastic yielding of the joint, i.e., the surrounding metal. In order to do this, the recovery stress as a function of the recovery strain should be known and calculated.

Figure 4:
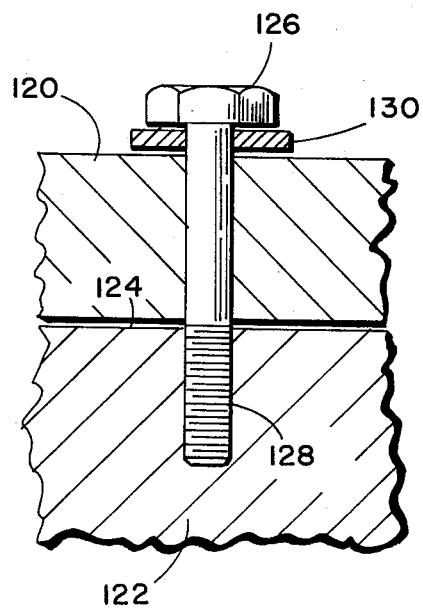
FIG. 4 shows a sectional view of a bolt with a Nitinol washer of this invention for loading the head of an internal combustion engine prior to load being applied by the invention; and, FIG. 5 shows the head of an engine having been loaded by this invention at ambient temperature.
Figure 5:
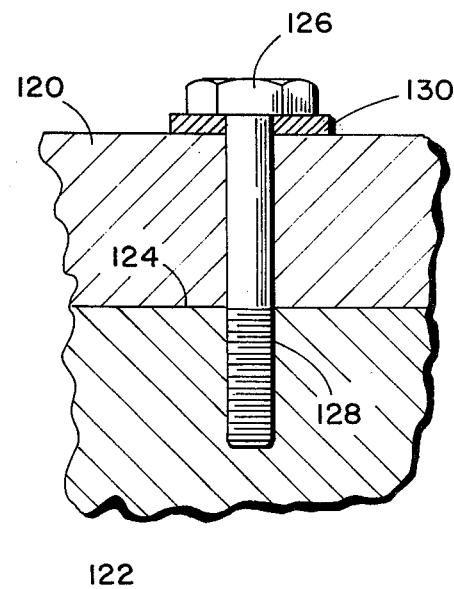

Looking more particularly at FIGS. 4 and 5, a head bolt configuration for various structural elements, and in particular, for securing part of an engine to a block has been shown. In this embodiment, a head of an internal combustion engine 120 has been shown overlying the block of an internal combustion engine 122. The heat 120 overlying the block has a space 124 which is generally sealed by a gasket. A bolt 126 having threads 128 which thread into the head 122 is shown. The bolt 126 with the threads 128 is provided with a Nitinol washer 130 which underlies the head of the bolt 126. When the washer has been cooled below its deformation temperature and then deformed, it is placed in position as shown in FIG. 4 and the bolt is tightened until it contacts the Nitinol washer.

In FIG. 5 the bolt 126 has been shown with the Nitinol washer 130 brought back to ambient temperature so that it is driven against the block 122 to completely load and seal the head 120 against the block 122. This effectively provides a pre-load and pre-stress to the bolts of an engine block. The pre-load and pre-stress can be such that it accommodates a proper loading against the head of the engine block in an analogous manner to torqueing down the bolts sufficiently. The entire function of the bolt securing the head 120 to the block 122 with the washer 130 is such that it can not only provide the function of a tightened head to block configuration that is normally done by a torque wrench, but can also lock the bolt in place by providing an upward loading force against the bolt in a manner of a consistent lock washer.

It should be understood that various design configurations as to the size of the washer 130, the amount of load that it is to provide against the bolt head, depending upon the various temperatures and expansion capabilities, can be designed to accommodate respectively different size engines and head and bolt configurations.

The foregoing showings of FIGS. 2 and 5 have shown the Nitinol segments in place after raising them to ambient temperature.

Figure 3:
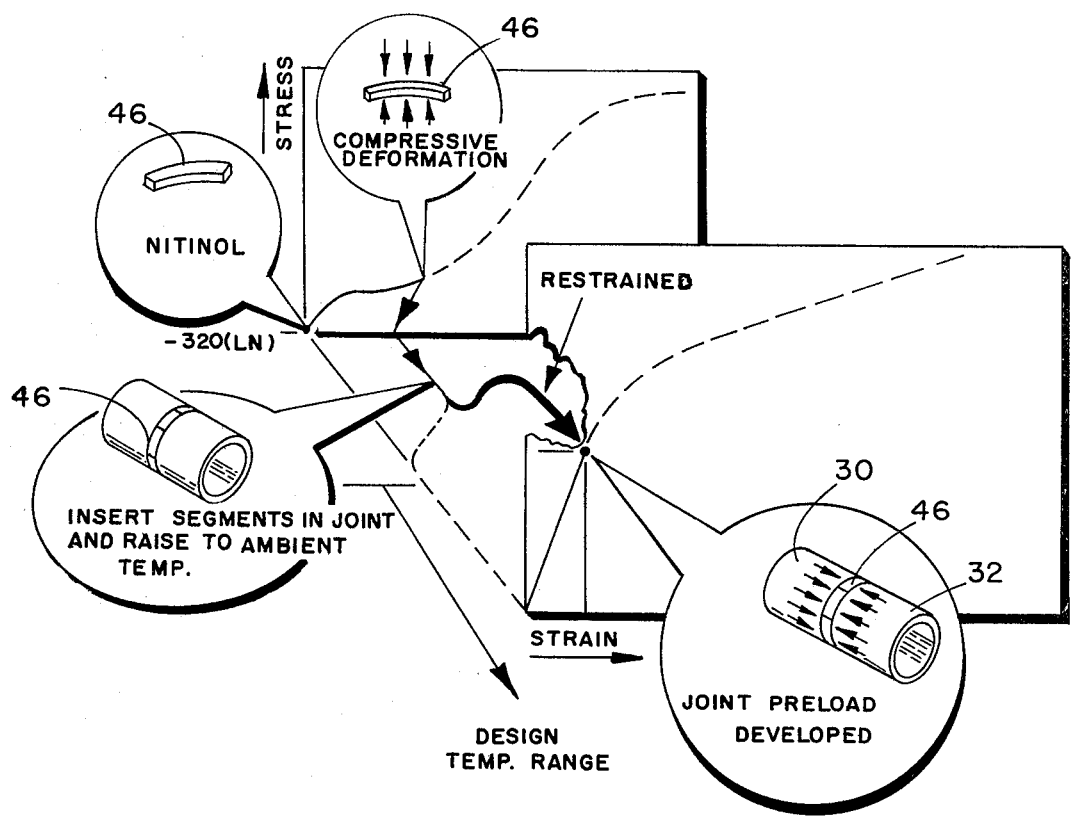
FIG. 3 shows a stress-strain temperature recovery history of a Nitinol segment during pre-load development and thereafter through its various stress-strain and temperature relationships.

FIG. 3 shows a stress-strain temperature history of a Nitinol segment as it would be used with a pipe or casing such as that shown in FIG. 2. Accordingly, the segments 30 and 32 have been shown with a Nitinol segment 46 implaced therein. The Nitinol segment 46 has gone through a pre-load development as follows.

The Nitinol segment 46, which can be segmented as shown in different arcuate elements is cooled, by way of example, to minus 320° F. by liquid nitrogen. As can be seen, it can undertake a compressive deformation as it is placed under the stress curve thereof. After undergoing compressive deformation, it is raised in temperature to a particular ambient temperature and is restrained by virtue of the fact that it is implaced between the two respective elements 30 and 32. Under restraint, it thereby provides a pre-load at its given design temperature range. If it were unrestrained, as shown by the dotted configuration in FIG. 3, it would return to its normal configuration.

Without restraint, the segment 46 would return to its normal shape from its original memory. However, the situation is such that it has been restrained and accordingly provides the load. The particular temperature of minus 320° F. that the segment 46 has been exposed to by liquid nitrogen assuming a correct cobalt titanium nickel alloy structure, provides compressive deformation capable of being expanded from a minus 8% to its normal conformation. This thereby provides the pre-load against segments 30 and 32 and prestresses the entire structure.

From the foregoing, it can be seen that the installation can be accomplished by firstly installing a Teflon ring, such as ring 54 over the male portion of a joint or within the slot 42 to provide the insulation required. The Nitinol ring can then be inserted after implacement in a liquid nitrogen bath and deformed. Once cooled and deformed, the Nitinol ring and the steel insulators 48 and 50 can be implaced. At this point, the Nitinol can then expand back to ambient and drive the members 30 and 32 into compression.

Various ways of cooling the Nitinol segments and deforming them in place can be effectuated. Suffice it to say, the cooling takes place and then thereafter an effective loading when the Nitinol returns to ambient thereby providing the elemental force necessary for the stressing of the joints and fasteners of this invention.

From the foregoing specification, it should be understood that the basic invention hereof of Nitinol providing a pre-stressed joint for fastening, particularly as it relates to threaded objects, is a broad step over the prior art for certain structures and should be read broadly in light of the following claims.

I claim:

1. A structural joint wherein two portions of a structure are joined together by a connection means at a parting line which joint comprises:
    a first member;
    a second member;
    a connection means;
    a third member interposed within said connection means which has been formed from a nickel-titanium alloy containing up to 5% by weight of cobalt and which has been compressively deformed below its transformation temperature to provide an expansive stress against said connection means and said first and second members when at ambient temperature.

2. A structural joint wherein two portions of a structure are joined together at a parting line comprising:
    a first member of said structure having threads;
    a second member of said structure having threads suitable for threading to the threads of said first member for making a threaded connection between them; and,
    a member formed from a nickel-titanium alloy containing up to 5% by weight of cobalt which has been compressively deformed below its transformation temperature and placed in operative relationship to said joint for purposes of placing a stress on said first and second members at said threaded connection when said nickel-titanium alloy member expands size at ambient temperature.

3. The structure as claimed in claim 2 wherein:
    said first member and said second member are cylindrical members having threads at the joint for placing them in connected relationship; and, a space between said first and second members for receiving said nickel-titanium alloy member so that said nickel-titanium alloy member can expand at ambient temperature for pre-stressing the threaded joint between said first and second members.

4. The structure as claimed in claim 3 wherein: said threads are buttress threads.

5. The structure as claimed in claim 3 further comprising:
an insulator between the surface of at least one of said cylindrical members and said nickel-titanium alloy member.

6. The structure as claimed in claim 2 wherein: said structure is formed as a shell structure.